US012033537B1

(12) United States Patent
Hu

(10) Patent No.: US 12,033,537 B1
(45) Date of Patent: Jul. 9, 2024

(54) SCENE SIMULATION DEVICE

(71) Applicant: Shouhong Hu, Hunan Province (CN)

(72) Inventor: Shouhong Hu, Hunan Province (CN)

( * ) Notice: Subject to any disclaimer, the term of this patent is extended or adjusted under 35 U.S.C. 154(b) by 0 days.

(21) Appl. No.: 18/452,039

(22) Filed: Aug. 18, 2023

(30) Foreign Application Priority Data

Aug. 4, 2023 (CN) ........................ 202322095041.0

(51) Int. Cl.
*G09F 19/02* (2006.01)

(52) U.S. Cl.
CPC .................................... *G09F 19/02* (2013.01)

(58) Field of Classification Search
CPC ................................ A63J 5/028; G09F 19/02
USPC .................................................... 40/409, 410
See application file for complete search history.

(56) References Cited

U.S. PATENT DOCUMENTS 2,543,606 A * 2/1951 Solomon ................. A63J 5/028 472/75
3,415,512 A * 12/1968 Burnbaum ......... A47G 33/0845 40/409
3,415,513 A * 12/1968 Burnbaum ......... A47G 33/0845 40/477
4,028,830 A * 6/1977 Ottinger .................. A63J 5/028 40/410
5,313,727 A * 5/1994 Murray, Jr. ............. G09F 19/02 40/430
6,036,571 A * 3/2000 Chang ..................... G09F 19/08 40/410
6,269,566 B1 * 8/2001 Lo ........................... G09F 19/08 40/406
6,550,169 B1 * 4/2003 Sena ....................... G09F 19/02 40/406
6,591,525 B1 * 7/2003 Liu ......................... G09F 19/08 40/410
11,626,042 B2 * 4/2023 Liu ......................... G09F 19/02 40/410
2002/0069565 A1 * 6/2002 Liao ........................ G09F 19/02 40/406
2002/0106249 A1 * 8/2002 Lin ......................... G09F 19/02 406/106
2003/0177677 A1 * 9/2003 Acosta, Sr. ............. G09F 19/02 40/410
2005/0120602 A1 * 6/2005 Skinner ................... G09F 19/10 40/410

FOREIGN PATENT DOCUMENTS

CN 220374176 U * 1/2024

* cited by examiner

*Primary Examiner* — Cassandra Davis

(57) ABSTRACT

The present disclosure provides a scene simulation device includes a housing with a scene space, flocs, a transport pipeline and a fan which are arranged in the housing. One end of the transport pipeline is communicated to a bottom of the scene space, and the other end is located at a position, close to a top of the scene space. The flocs are configured to enter the transport pipeline along the bottom of the scene space, are transported along the transport pipeline when the fan is started, and are sprayed out from a top of the transport pipeline. A dispersing component configured to disperse the flocs sprayed out of the transport pipeline is arranged in the scene space. The falling range of the flocs can be expanded, and the mechanical unreality caused by the small falling range of the flocs is prevented, so as to better create a scene atmosphere.

20 Claims, 10 Drawing Sheets

A-A

SCENE SIMULATION DEVICE

CROSS-REFERENCE TO RELATED APPLICATIONS

The application claims priority of Chinese patent application CN2023220950410, filed on Aug. 4, 2023, which is incorporated herein by reference in its entireties.

TECHNICAL FIELD

The present disclosure relates to the technical field of decorations, and particularly to, a scene simulation device.

BACKGROUND

At present, there are existing snowing crystal balls, and a user needs to shake the crystal ball to achieve a snowing effect. This method is cumbersome, and the snowing effect disappears when white flocs inside the crystal ball fall, so a snow scene is unsustainable.

To solve this problem, according to the existing snow scene simulation device, an air blower would be mounted at a bottom of the device. The air blower is used in conjunction with a pipeline to blow the white flocs from the bottom to the top of the simulation device. The white flocs fall from top to bottom. After being caught by a filter screen near the top of the simulation device, the white flocs fall, simulating a snow scene. However, in this way, the white flocs can easily block meshes on the filter screen, affecting the snowing effect. Furthermore, when the air blower is used in conjunction with the pipeline to blow the white flocs from the bottom to the top of the simulation device, a position where the white floc fall on the filter screen is always within a position range of the filter screen, so that the falling range of the white flocs through the filter screen is small and not dispersed enough, which affects the effect of the snow scene.

SUMMARY

The present disclosure mainly aims to provide a scene simulation device used to solve the problem that the snow scene effect is affected due to a small falling range of white flocs because of cooperation between an air blower and a filter screen in an existing snow scene simulation device.

In order to solve the above technical problem, the technical solution of the present disclosure is as follows: a scene simulation device includes a housing with a scene space, and flocs, a transport pipeline, and a fan which are arranged in the housing. One end of the transport pipeline is communicated to a bottom of the scene space, and the other end is located at a position, close to a top, of the scene space; the flocs are configured to enter the transport pipeline along the bottom of the scene space, are transported along the transport pipeline when the fan is started, and are sprayed out from a top of the transport pipeline; and a dispersing component configured to disperse the flocs sprayed out of the transport pipeline is arranged in the scene space.

In one embodiment, the dispersing component is arranged towards the top of the transport pipeline, and at least part of an outer surface of the dispersing component is one of a spherical surface, a class spherical surface, cambered surface, a and a slope; and each of the class spherical surface and the class cambered surface is composed of at least one cambered surface and/or at least one plane.

In one embodiment, the dispersing component and the housing are integrally formed.

In one embodiment, an atmosphere lamp is arranged at the top of the scene space.

In one embodiment, a scene base and a scene decoration arranged on the scene base are arranged in the scene space, and a bottom surface of the scene base is spaced apart from a bottom surface of the scene space.

In one embodiment, the bottom surface of the scene space is connected to the scene base through a plurality of support columns spaced apart from each other.

In one embodiment, a plurality of display windows are formed in a side wall of the housing; transparent plates are arranged at the display windows; and the transport pipeline is located between two adjacent display windows.

In one embodiment, the transport pipeline includes a bottom pipeline communicated to the scene space and a vertical pipeline connected to the bottom pipeline and parallel to a side wall of the scene space; the vertical pipeline is located directly below the dispersing component at one end far from the bottom pipeline; and the bottom pipeline is connected to an air outlet of the fan at one end far from the vertical pipeline.

In one embodiment, a width of a cross section of the scene base gradually decreases from bottom to top, and a circumferential side of the scene base is spaced part from a side wall of the scene space; and a width of a cross section of the bottom surface of the scene space gradually decreases from top to bottom.

In one embodiment, the housing includes a housing base, a middle frame connected to the housing base, and a top housing connected to the middle frame; the scene space is composed of the housing base, the middle frame, and the top housing;

the plurality of display windows are located on a side wall of the middle frame; the dispersing component is located on the top housing; the fan and the bottom pipeline are both located in the housing base; and the vertical pipeline is located on an inner side of the middle frame.

In one embodiment, the housing base includes a surface housing and a bottom plate connected to the surface housing to form a mounting cavity; the fan and the bottom pipeline are both located in the mounting cavity; the surface housing is provided with a first through hole communicated with the bottom pipeline and a second through hole communicated with the bottom pipeline and the vertical pipeline respectively; and the fan is located on one side, far from the vertical pipeline, of the first through hole.

In one embodiment, the bottom pipeline includes: two pipeline side walls integrally injection-molded with the surface housing and a panel connected to the pipeline side walls; the surface housing protrudes upwards along a circumferential side of the second through hole to form a plugging enclosure wall; and a bottom of the vertical pipeline is arranged in the plugging enclosure wall.

In one embodiment, the surface housing includes a boss, a first step connected to a bottom of the boss, and a second step connected to a bottom of the first step; a bottom of the middle frame sleeves an outer side of the first step and is connected to the second step; and the transparent plates are located between an inner side wall of the middle frame and an outer side wall of the boss.

In one embodiment, the top housing includes an outer cover and a transparent inner cover arranged on an inner side of the outer cover; a plurality of light decoration holes are formed in both the outer cover and the middle frame; and the dispersing component is integrally formed with the transparent inner cover.

In one embodiment, a first plugging slot for plugging the middle frame is formed in a bottom surface of the outer cover; the outer cover forms a plurality of limiting plates on an inner side of the first plugging slot; the limiting plates are located on an inner side of the middle frame and are spaced apart from the inner side wall of the middle frame to form a second plugging slot; and the transparent plates are located in the second plugging slot.

In one embodiment, a circuit board electrically connected to the fan and the atmosphere lamp is arranged in the housing base, and a USB interface electrically connected to the circuit board and used for data transmission is arranged on the housing base.

In one embodiment, a speaker electrically connected to the circuit board is also arranged in the housing base, and a sound outlet is formed in a position, corresponding to the speaker, on a bottom of the housing base.

In one embodiment, the circuit board is provided with a wireless module configured to be connected to external equipment.

In one embodiment, a handle portion is arranged at a top of the top housing.

In one embodiment, the top housing further includes a top connecting body; the top connecting body includes a left housing arranged at a top of the outer cover and a right housing connected to the left housing and forming an accommodating cavity penetrating through the top connecting body; and two ends, close to the accommodating cavity, of the handle portion arranged in the accommodating cavity are raised to form limiting convex blocks.

Beneficial effects: compared with the prior art, in this embodiment, due to the dispersing component, after the flocs are sprayed out of the top of the transport pipeline under the driving of the fan, the dispersing component is used to disperse the flocs to expand a falling range of the flocs, which solves the problem of a small falling range of the flocs because of cooperation between an air blower and a filter screen in an existing snow scene simulation device, so that a snow scene or another atmospheric scene is better created.

BRIEF DESCRIPTION OF THE DRAWINGS

In order to explain the technical solutions of the embodiments of the present disclosure more clearly, the following will briefly introduce the accompanying drawings used in the embodiments. Apparently, the drawings in the following description are only some embodiments of the present disclosure. Those of ordinary skill in the art can obtain other drawings based on these drawings without creative work.

DETAILED DESCRIPTION OF THE EMBODIMENTS

Figure 1:
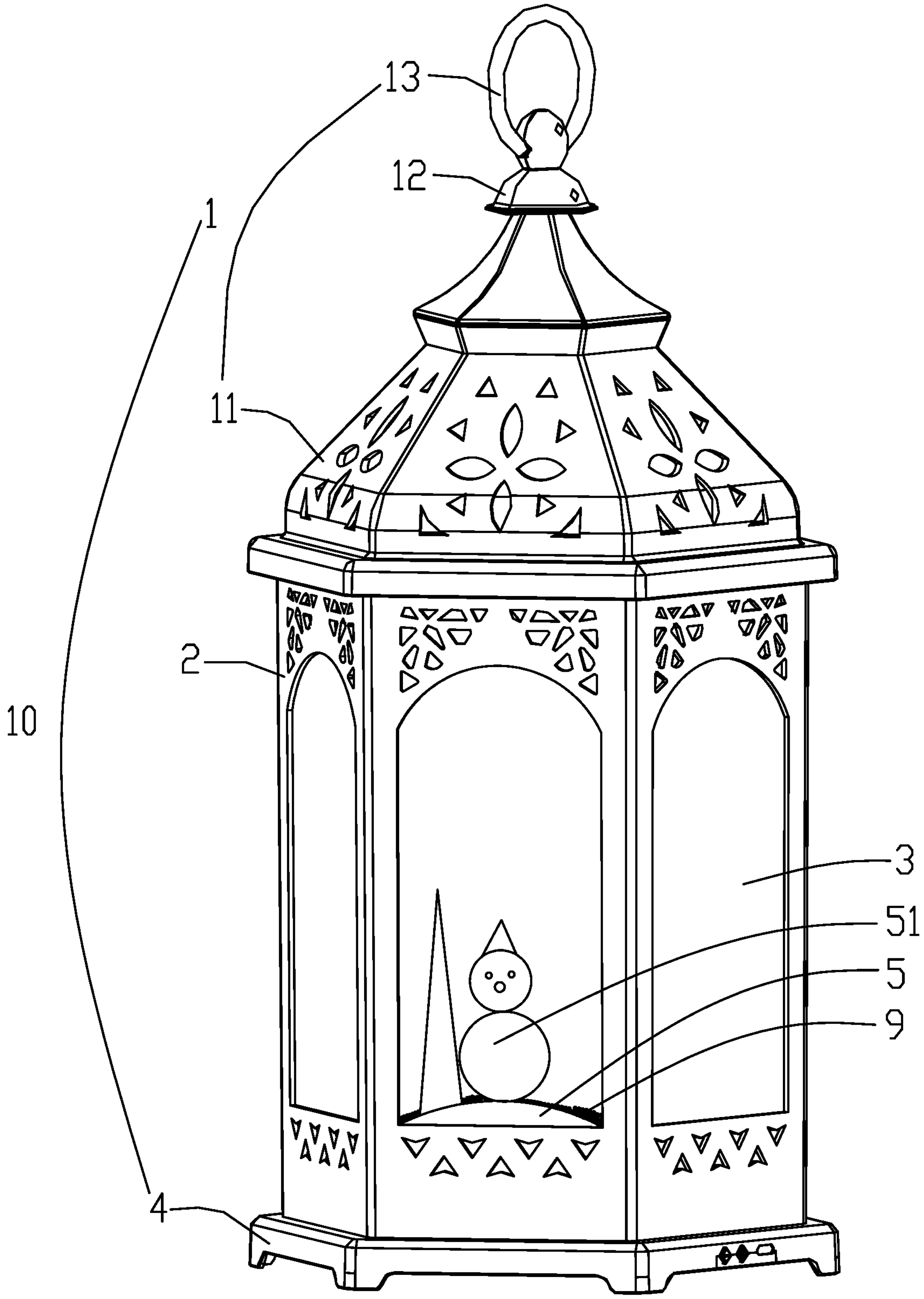
FIG. 1 is a three-dimensional diagram of the present disclosure.

Referring to FIG. 1 to FIG. 10, a scene simulation device in the embodiments of the present disclosure is shown.

The scene simulation device includes a housing 10 with a scene space 21, and flocs 9, a transport pipeline, and a fan 8 which are arranged in the housing 10. One end of the transport pipeline is communicated to a bottom of the scene space 21, and the other end is located at a position, close to a top, of the scene space 21. The flocs 9 are configured to enter the transport pipeline along the bottom of the scene space 21, are transported along the transport pipeline when the fan 8 is started, and are sprayed out from a top of the transport pipeline. A dispersing component 141 configured to disperse the flocs 9 sprayed out of the transport pipeline is arranged in the scene space 21.

In this embodiment, due to the dispersing component 141, after the flocs 9 are sprayed out of the top of the transport pipeline under the driving of the fan 8, the dispersing component 141 is used to disperse the flocs 9 to expand a falling range of the flocs 9, which solves the problem of a small falling range of the flocs 9 because of cooperation between an air blower 8 and a filter screen in an existing snow scene simulation device, so that a snow scene or another atmospheric scene is better created.

Specifically, the dispersing component 141 is arranged towards the top of the transport pipeline, and at least part of an outer surface of the dispersing component 141 is a surface, such as a spherical surface, a class spherical surface, a cambered surface, a class cambered surface, and a slope, which can disperse the flocs 9 sprayed out of the transport pipeline. Each of the class spherical surface and the class cambered surface is composed of at least one cambered surface and/or at least one plane, or is formed by combining at least one of the class spherical surface and the class cambered surface and at least one plane. In this way, after being sprayed from the top of the transport pipeline under the driving of the fan 8, the flocs 9 will hit the dispersing component 141. As the surface of the dispersing component 141 is the spherical surface, the class spherical surface, the cambered surface, the class cambered surface, or the slope, the flocs 9 hitting different positions on the dispersing component 141 may be reflected at different angles and fall, so that the flocs 9 can be dispersed at any position on a horizontal plane of the scene space 21, in order to expand the falling range of the flocs 9.

Figure 9:
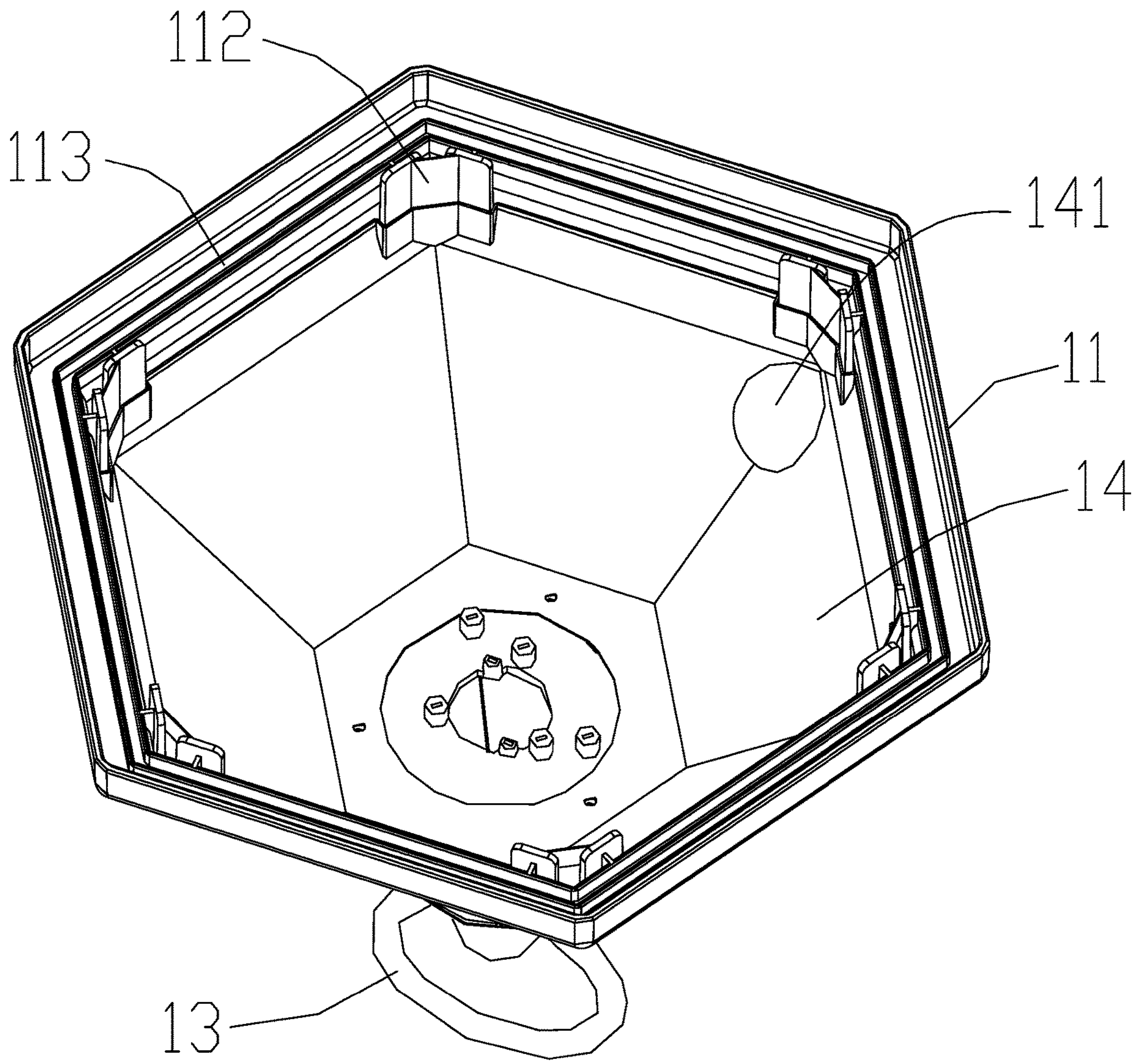
FIG. 9 is a schematic diagram of a top housing of the present disclosure.

In the above embodiment, referring to FIG. 9, the dispersing component 141 is integrally formed with the housing 10 to reduce manufacturing steps of the scene simulation device in this embodiment and improve the production effect. Of course, in other embodiments, the dispersing component 141 can also be fixed to the housing 10 by pasting or welding. A connection way between the dispersing component 141 and the housing 10 is not limited here.

Figure 4:
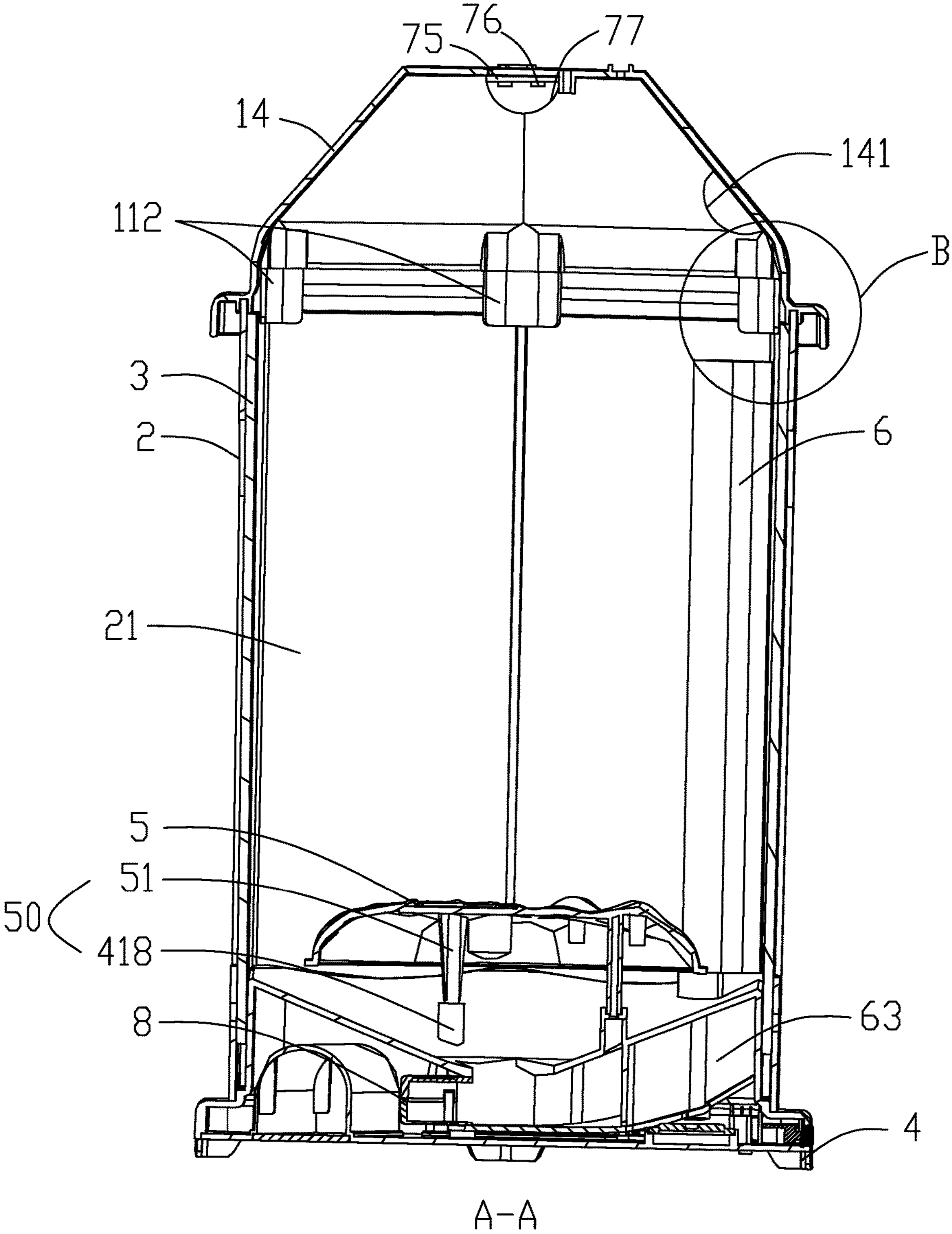
FIG. 4 is a partially cutaway view of FIG. 3 along the A-A direction.

In an embodiment, referring to FIG. 4, an atmosphere lamp 76 is arranged at a top of the scene space 21. By using the atmosphere lamp 76, the scene simulation device can better create an environmental atmosphere. To create a warm atmosphere, the atmosphere lamp 76 can emit warm yellow light. To create a festive atmosphere, the atmosphere lamp 76 can emit colorful light. When the atmosphere lamp 76 is turned on, a user can enjoy the light at night or in a dark environment.

In an embodiment, a scene base 5 and a scene decoration 51 arranged on the scene base 5 are arranged in the scene space 21. By using the scene base 5 and the scene decoration 51, a scene space 21 can be created, such as a snow space and a fantasy space.

An upper surface of the scene base 5 may be white, green, pink, or the like, or an upper surface of the scene base 5 is provided with a lawn or covered with pink particles. The scene decoration 51 can be a Christmas tree, a snowman, a gift box, a pet, a house, and the like; and the scene decoration 51 can be fixed on the scene base 5 by pasting or plugging. The flocs 9 can be white particles, pink particles, feathers, flakes, or the like. Manufacturers can set the flocs according to a desired scene effect. There are no restrictions on the scene base 5, the scene decoration 51, and the flocs 9 here.

Continuing with reference to FIG. 4, a bottom surface of the scene base 5 is spaced apart from a bottom surface of the scene space 21. A circumferential side of the scene base 5 is spaced part from a side wall of the scene space 21; and a width of a cross section of the scene base 5 gradually decreases from bottom to top, so that the flocs 9 can slide off from the surface of the scene base 5 to the bottom of the scene space 21 after falling to the scene base 5.

In an embodiment, the bottom surface of the scene space 21 is connected to the scene base 5 through a plurality of support columns 50 spaced apart from each other. The scene base 5 and the bottom surface of the scene space 21 are spaced apart from each other by using the support columns 50, so that the flocs 9 are located at the bottom of the scene space 21. Of course, in other embodiments, the bottom of the scene base 5 can also be provided with a bottom avoiding opening for guiding the flocs 9 to the scene space 21.

Specifically, in the above embodiment, the support columns 50 are arranged on the bottom surface of the scene space 21 and are connected to the scene base 5 through screws. Or, the support columns 50 are arranged at the bottom of the scene base 5 and are connected to the bottom surface of the scene space 21 through screws. Or, the support columns 50 includes a first column body 51 arranged on the scene base 5 and a second column body 418 arranged on the bottom surface of the scene space 21. The first column body 51 and the second column body 418 are connected to each other in a plugging manner or through screws, and the scene base 5 can also be spaced apart from the bottom surface of the scene space 21.

A width of a cross section at the bottom surface of the scene space 21 gradually decreases from top to bottom, so that the flocs 9 slide down to the bottom of scene space 21. Specifically, the bottom surface of the scene space 21 can be a cambered surface, a slope, or the like.

Figure 2:
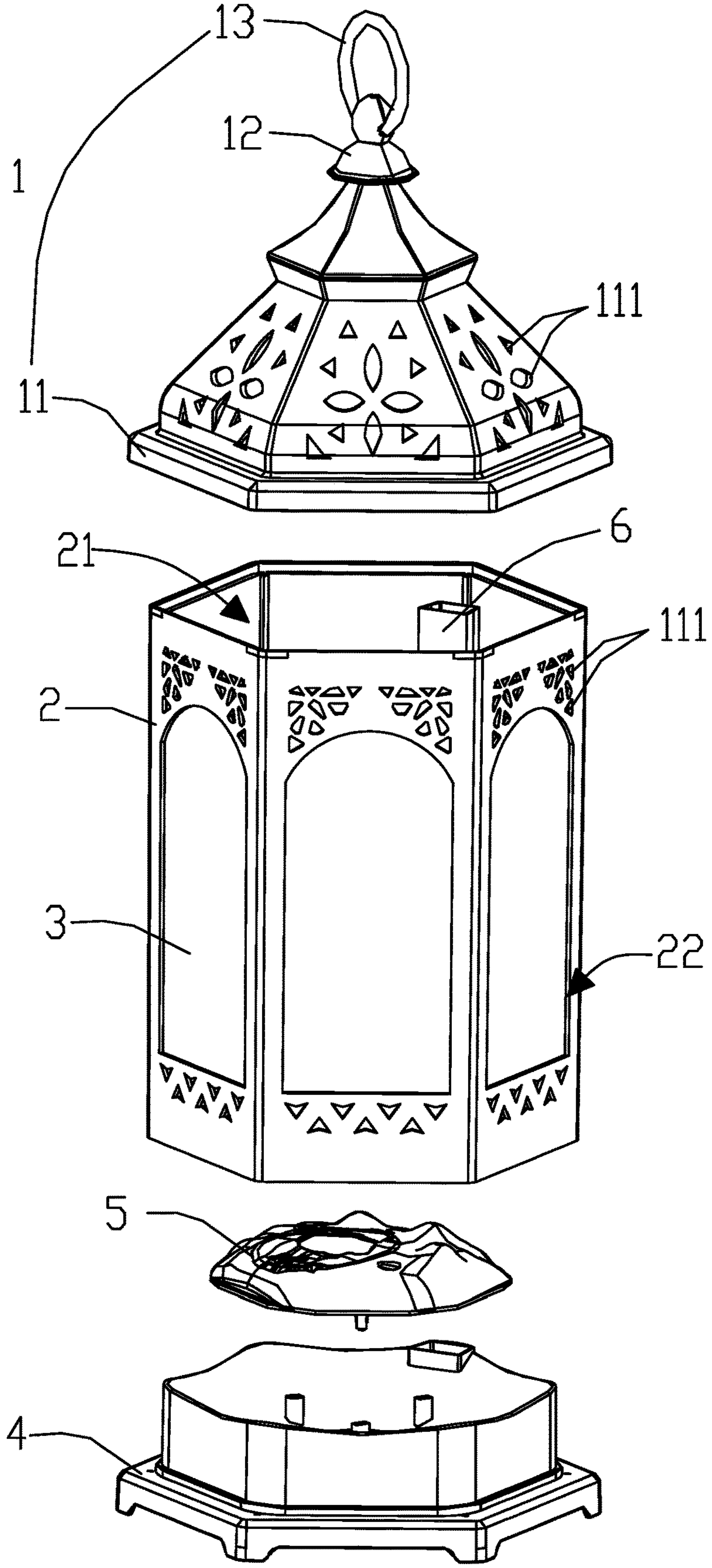
FIG. 2 is a partially exploded view of the present disclosure.
Figure 3:
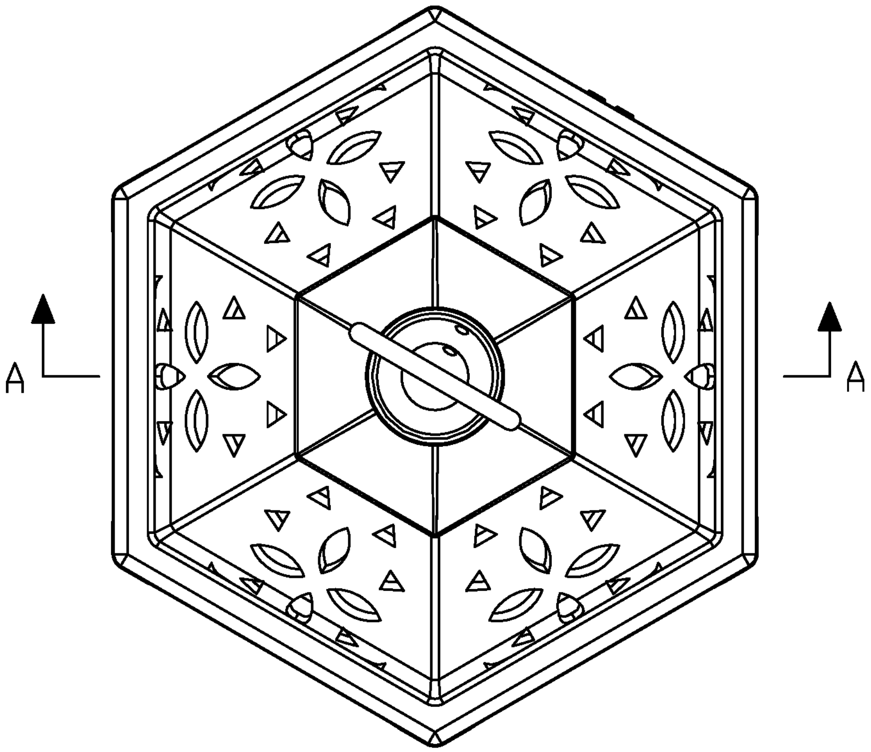
FIG. 3 is a top view of the present disclosure.

In an embodiment, referring to FIG. 2, a plurality of display windows 22 are formed in a side wall of the housing 10; transparent plates 3 are arranged at the display windows 22. A scene in the scene simulation device of this embodiment can be shown through the transparent plates 3. The transport pipeline is located between two adjacent display windows 22 to hide it from users and prevent it from affecting simulation of a scene in the scene simulation device.

In an embodiment, referring to FIG. 4, the transport pipeline comprises a bottom pipeline 63 communicated to the scene space 21 and a vertical pipeline 6 connected to the bottom pipeline 63 and parallel to a side wall of the scene space 21. The vertical pipeline 6 is located directly below the dispersing component 141 at one end far from the bottom pipeline 63; and the bottom pipeline 63 is connected to an air outlet of the fan 8 at one end far from the vertical pipeline 6. In this way, after the flocs 9 fall into the bottom pipeline 63, the fan 8 performs driving to blow the flocs 9 to move along the bottom pipeline 63 and the vertical pipeline 6 and be sprayed out from the top of the vertical pipeline 6.

In the above embodiment, in order to facilitate the production and manufacturing of the scene simulation device of this embodiment, the housing 10 includes a housing base 4, a middle frame 2 connected to the housing base 4, and a top housing 1 connected to the middle frame 2. The scene space 21 is composed of the housing base 4, the middle frame 2, and the top housing 1. The plurality of display windows 22 are distributed around the middle frame 2, and the dispersing component 141 is located on the top housing 1. The fan 8 and the bottom pipeline 63 are both located in the housing base 4, and the vertical pipeline 6 is located on an inner side of the middle frame 2.

Specifically, referring to FIG. 2, the housing base 4 includes a surface housing 41 and a bottom plate 42 connected to the surface housing 41 to form a mounting cavity 411; and the fan 8 and the bottom pipeline 63 are both located in the mounting cavity 411. An upper surface of the surface housing 41 is the bottom surface of the scene space 21. The surface housing 41 is provided with a first through hole 417 communicated with the bottom pipeline 63 and a second through hole 415 communicated with the bottom pipeline 63 and the vertical pipeline 6 respectively; and the fan 8 is located on one side, far from the vertical pipeline 6, of the first through hole 417. In this way, the flocs 9 can fall into the bottom pipeline 63 from the first through hole 417, the fan 8 is started to blow the flocs 9 to move along the bottom pipeline 63 and the vertical pipeline 6 and be sprayed out from the top of the vertical pipeline 6.

Figure 7:
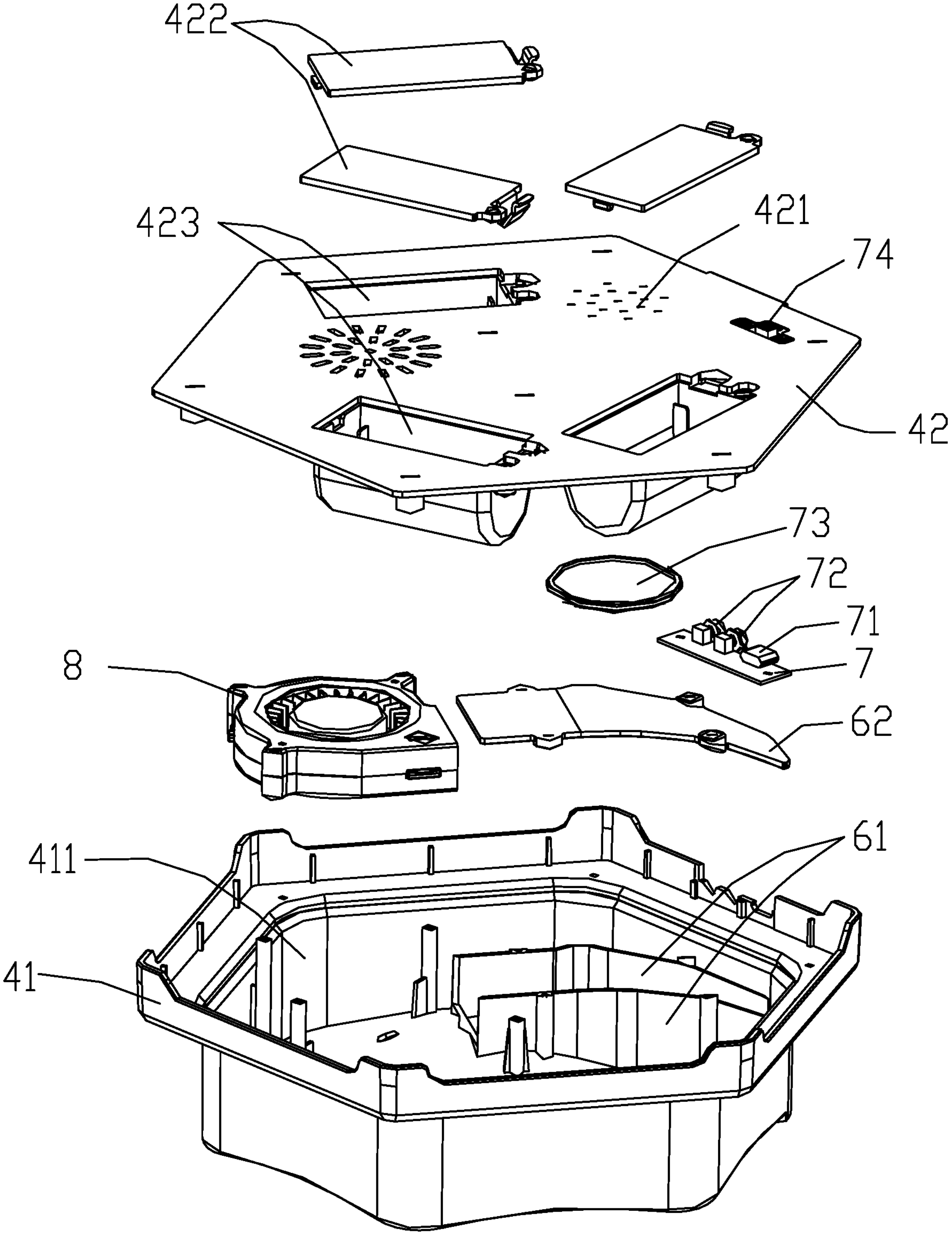
FIG. 7 is an exploded diagram of a housing base of the present disclosure.
Figure 8:
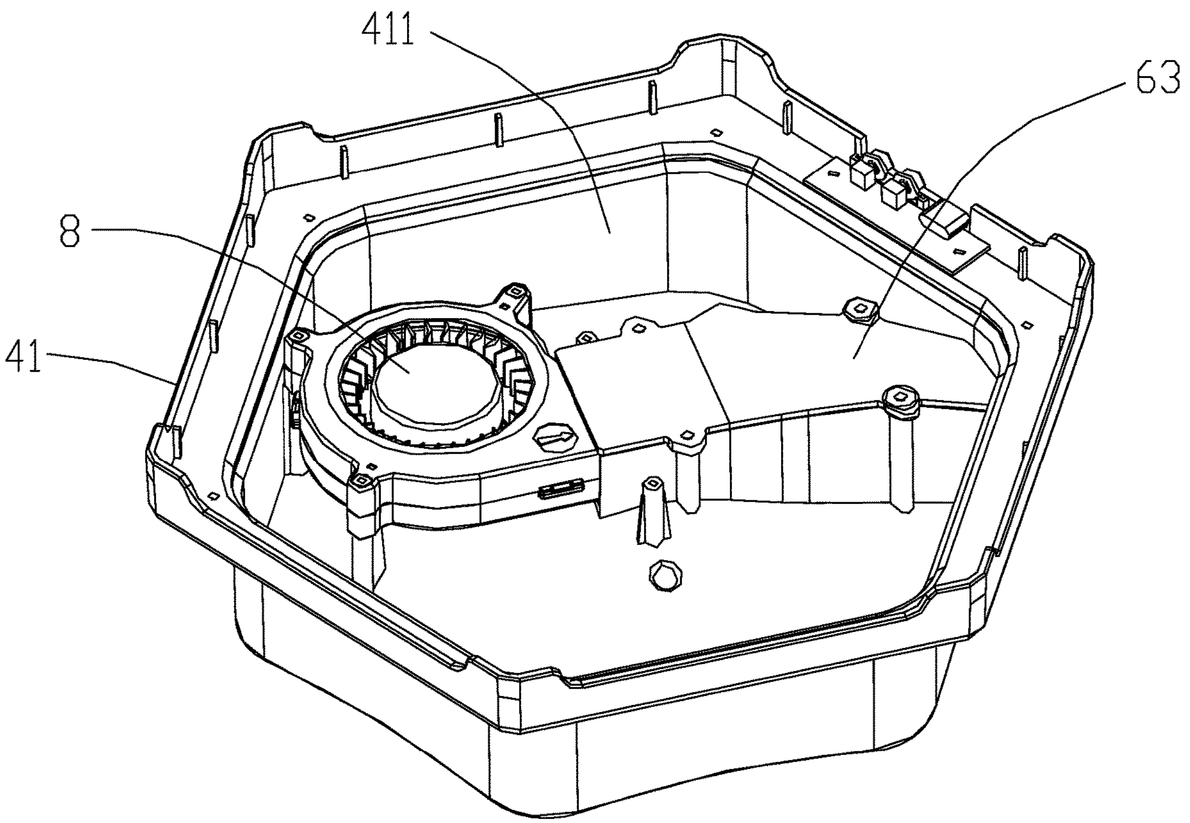
FIG. 8 is a schematic diagram of mounting a fan and a bottom pipeline of the present disclosure.

In an embodiment, referring to FIG. 7, the bottom pipeline 63 includes: two pipeline side walls 61 integrally injection-molded with the surface housing 41 and a panel 62 connected to the pipeline side walls 61. The surface housing 41 protrudes upwards along a circumferential side of the second through hole 415 to form a plugging enclosure wall 416; and a bottom of the vertical pipeline 6 is arranged in the plugging enclosure wall 416. By using the plugging enclosure wall 416, it is convenient for mounting the vertical pipeline 6 and achieving communication connection with the bottom pipeline 63, which facilitates the production and manufacturing of the scene simulation device of this embodiment.

Figure 6:
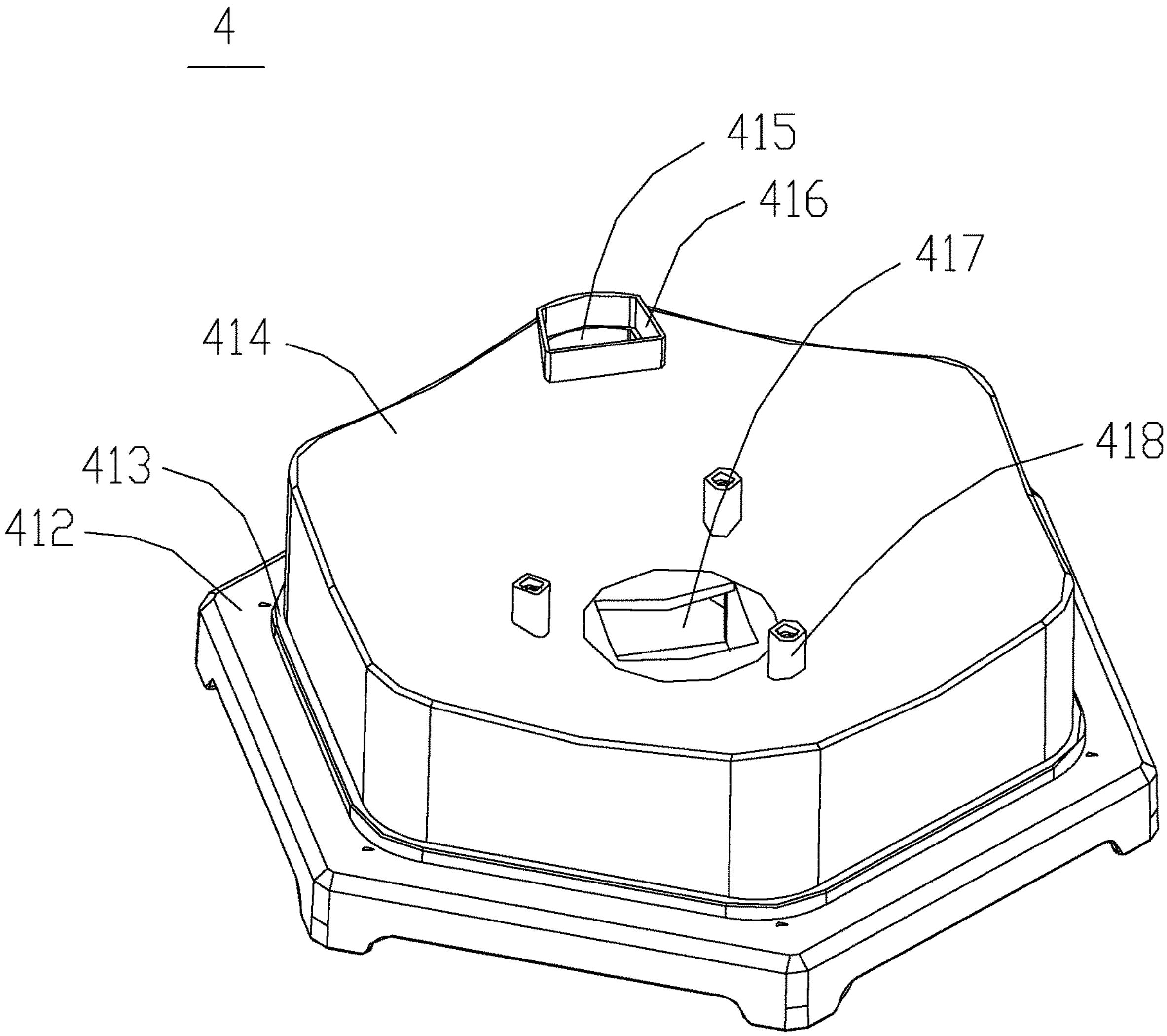
FIG. 6 is a schematic diagram of a housing base of the present disclosure.

In an embodiment, referring to FIG. 6, the surface housing 41 includes a boss 414, a first step 413 connected to a bottom of the boss 414, and a second step 412 connected to a bottom of the first step 413. A bottom of the middle frame 2 sleeves an outer side of the first step 413 and is connected to the second step 412 to connect the middle frame 2 to the housing base 4. The transparent plates 3 are located between an inner side wall of the middle frame 2 and the outer side wall of the boss 414. A width of the first step 413 is consistent with a thickness of each transparent plate 3, so as to fix the transparent plate 3 using the outer side wall of the boss 414 and the inner side wall of the middle frame 2 and prevent the flocs 9 from falling between the outer side wall of the boss 414 and the inner side wall of the middle frame 2.

Specifically, the middle frame 2 is a hexagonal prism, and a shape of the outer side wall of the boss 414 is consistent with a shape of the middle frame 2. In this shape, there are six display windows 22 corresponding to six side walls of the hexagonal prism, and a position between two side walls of the middle frame 2 is locked and fixed with the second step 412 through screws. In other embodiments, the middle frame can also be a pentagonal prism, a cylinder, or the like. The shape of the middle frame 2 is not limited here.

In other embodiments, the transparent plates 3 can be fixed on the inner side wall of the middle frame 2 by pasting. There is no gap between the boss 414 and the middle frame 2 to accommodate the transparent plates 3. The transparent plates 3 may be glass plates, plastic plates, transparent films, or the like.

Figure 10:
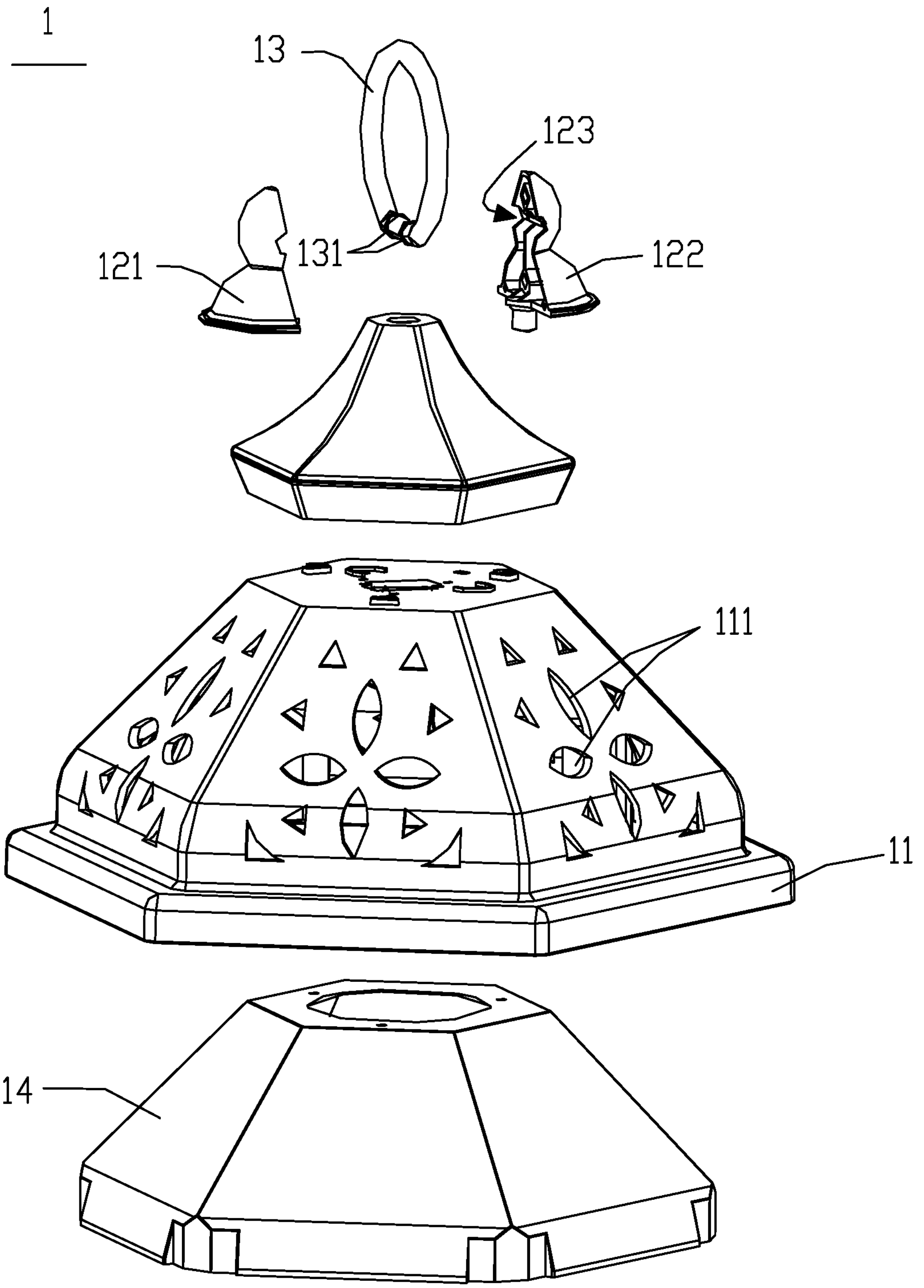
FIG. 10 is an exploded view of a top housing of the present disclosure.

In an embodiment, referring to FIG. 9 and FIG. 10, the top housing 1 includes an outer cover 11 and a transparent inner cover 14 arranged on an inner side of the outer cover 11; and a plurality of light decoration holes 111 are formed in both the outer cover 11 and the middle frame 2. By using the light decoration holes 111, the attractive appearance of the scene simulation device in this embodiment can be improved. Furthermore, when the atmosphere lamp 76 is turned on, light penetrates through the light decoration holes 111 to form light spots in the shape of the light decoration holes 111, which plays a role in decorating the surrounding environment to better create an atmosphere. In addition, the dispersing component 141 and the transparent inner cover 14 are integrally formed to facilitate the production and manufacturing of the scene simulation device in this embodiment.

Figure 5:
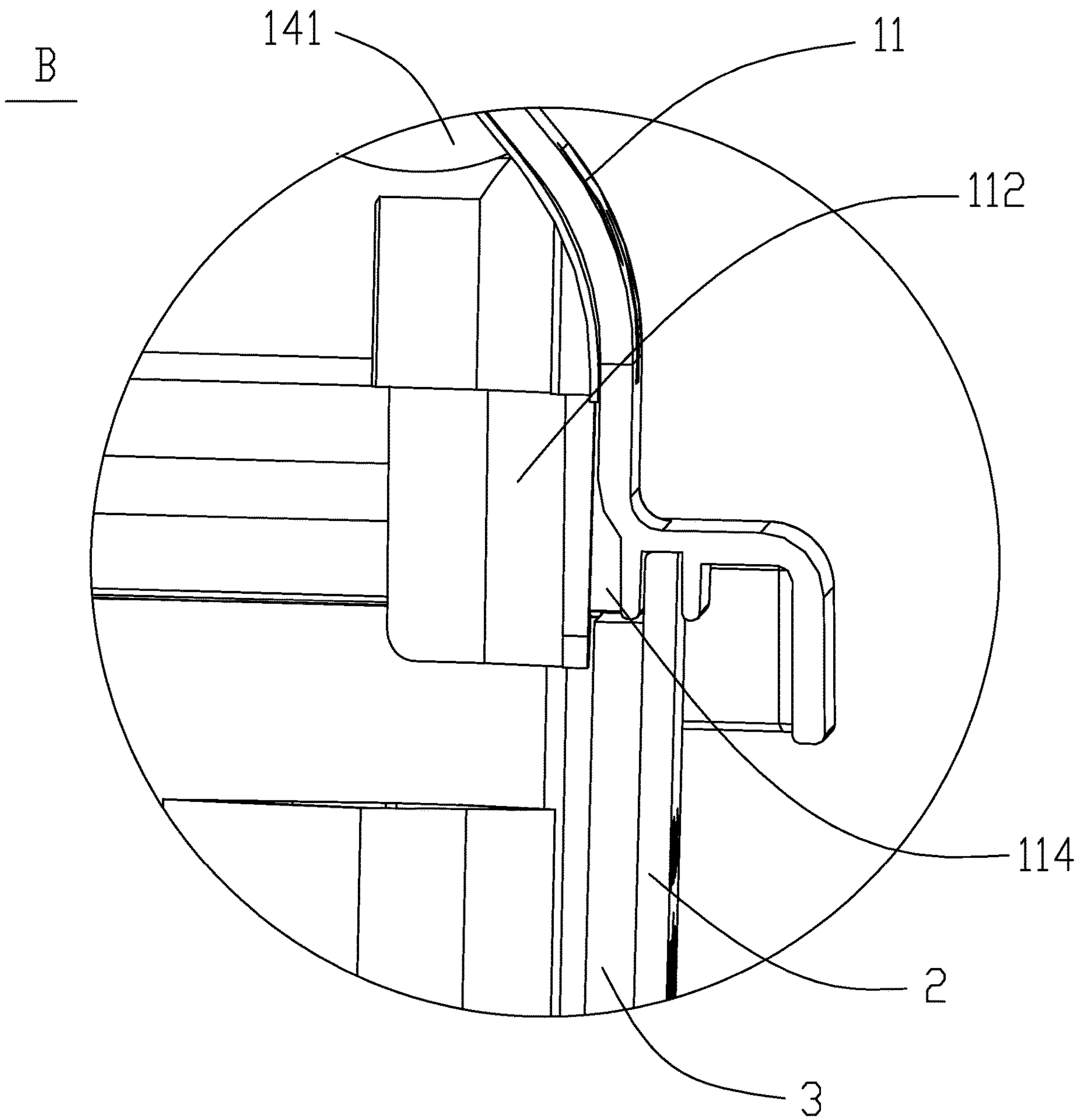
FIG. 5 is an enlarged diagram of the region B in FIG. 4.

In an embodiment, referring to FIG. 9, FIG. 4, and FIG. 5, a first plugging slot 113 for plugging the middle frame 2 is formed in a bottom surface of the outer cover 11. A top of the middle frame 2 is arranged in the first plugging slot 113, so as to improve the structure compactness of the scene simulation device of this embodiment. Specifically, the top of the middle frame 2 can be connected to the outer cover 11 by gluing, fastening, screwing, or the like. The outer cover 11 forms a plurality of limiting plates 112 on an inner side of the first plugging slot 113; the limiting plates 112 are located on an inner side of the middle frame 2 and are spaced apart from the inner side wall of the middle frame 2 to form a second plugging slot 114; and the transparent plates 3 are located in the second plugging slot 114. The second plugging slot 114 is used to limit the transparent plates 3, which is convenient for mounting of the transparent plates 3. Upper and lower ends of the transparent plates 3 are limited from the bottom and the top in conjunction with the first step 413, so that the stability of mounting of the transparent plates 3 is improved.

Specifically, referring to FIG. 4, a lampshade 77 and a lamp panel 75 are arranged at an top of an inner side of the outer cover 11. The lamp panel 75 is located in the lampshade 77. The atmosphere lamp 76 is a Light-Emitting Diode (LED) and is mounted on the lamp panel 75 to facilitate the mounting of the atmosphere lamp 76. Specifically, LED can be a monochromatic lamp, a three-color lamp, or the like. The lamp panel 75 is fixed to the outer cover 11 by a screw, while the lampshade 77 can be fixed to the outer cover 11 by screws or pasting. In other embodiments, the lampshade 77 is a hemispherical lampshade 77. In order to enhance the atmosphere rendering effect, an outer surface of the hemispherical lampshade 77 is composed of multiple planes.

In an embodiment, referring to FIG. 10, a handle portion 13 is arranged at a top of the top housing 1. By using the handle portion 13, a user can conveniently hold the scene simulation device of this embodiment or hang the scene simulation device of this embodiment in the air.

Specifically, the top housing 1 further includes a top connecting body 12; the top connecting body 12 includes a left housing 121 arranged at a top of the outer cover 11 and a right housing 122 connected to the left housing 121 and forming an accommodating cavity 123 penetrating through the top connecting body 12. Specifically, the left housing 121 can be connected to the outer cover 11 through a screw, and the right housing 122 can be connected to the left housing 121 through a screw, a fastener, or the like. Two ends, close to the accommodating cavity 123, of the handle portion 13 arranged in the accommodating cavity 123 are raised to form limiting convex blocks 131. The limiting convex blocks 131 limit the handle portion 13, so that the handle portion 13 can be prevented from moving in a lengthwise direction of the accommodating cavity 123, and the stability of hanging in air and holding is improved. Of course, in this embodiment, shaft holes can also be formed in two ends of the top connecting body 12, and the two ends of the handle portion 13 are arranged in the shaft holes. Or, the handle portion 13 can be integrally formed with the top connecting body 12 to achieve mounting of the handle portion 13.

In the above embodiment, referring to FIG. 7, a circuit board 7 respectively electrically connected to the fan 8 and the lamp panel 75 is arranged in the housing base 4. The fan 8 and the lamp panel 75 can be controlled to be turned on and turned off through the circuit board 7. The housing base 4 is provided with a USB interface 71 that is electrically connected to the circuit board 7 and used for data transmission. The USB interface 71 can be used to update a circuit program on the circuit board 7 or upload a music or light control program to the circuit board 7, so as to control a light change effect of the atmosphere lamp 76.

The surface housing 41 is provided with a wiring hole (not shown in the figure) on one side, close to the middle frame 2, of the plugging enclosure wall 416 for wiring. One end of a wire connecting the lamp panel 75 to the circuit board 7 passes through the wiring hole and is distributed on the top housing 1 along a side wall of the middle frame 2 and connected to the lamp panel 75.

In an embodiment, a speaker 73 electrically connected to the circuit board 7 is also arranged in the housing base 4, and a sound outlet 421 is formed in a position, corresponding to the speaker 73, on a bottom of the housing base 4. Music can be played through the speaker 73, so that the atmospheric effect is improved, and the utility function of the scene simulation device of this embodiment is enhanced.

Specifically, a volume control button 72 electrically connected to the circuit board 7 and configured to control a volume of the speaker 73 is arranged on a side wall of the housing base 4.

In one embodiment, the circuit board 7 is provided with a wireless module (not shown in the figure) for connection to an external device. Specifically, the wireless module can be a Bluetooth module, a 4*g* module, a 3*g* module, a 2*g* module, etc., so that an external terminal can be connected to the scene simulation device of this embodiment for use, so as to change music being played, or to separately control the start and stop of the fan 8 and the start and stop of the music for user convenience. Specifically, the external terminal may be a mobile phone, a computer, or the like.

In one embodiment, the bottom of the housing base 4 is provided with a power button 74 electrically connected to the circuit board 7. Start and stop of the scene simulation device of this embodiment, start and stop of the fan 8, and start and stop of the music can be controlled by using the power button 74, which facilitates a user.

A battery compartment 423 is formed on the bottom plate 42, and a battery (not shown in the figure) electrically connected to the circuit board 7 is arranged in the battery compartment 423. A battery cover 422 is detachably arranged at a position, corresponding to the battery compartment 423, on the bottom plate 42, which facilitates a user to replace the battery. Specifically, the battery can be a rechargeable battery and can also be arranged in the mounting cavity 411. The USB interface 71 can also be configured to charge the rechargeable battery, or the like.

It should be noted that all directional indications (such as up, down, left, right, front, back . . . ) in the embodiments of the present disclosure are only used to explain a relative positional relationship between components, motion situations, etc. at a certain specific attitude (as shown in the figures). If the specific attitude changes, the directional indication also correspondingly changes.

In addition, the descriptions of "first", "second", etc. in the present disclosure are only used for descriptive purposes, and cannot be understood as indicating or implying its relative importance or implicitly indicating the number of technical features indicated. Therefore, features defined by "first" and "second" can explicitly instruct or impliedly include at least one feature. In addition, "and/or" in the entire text includes three solutions. A and/or B is taken as an example, including technical solution A, technical solution B, and technical solutions that both A and B satisfy. In addition, the technical solutions between the various embodiments can be combined with each other, but it needs be based on what can be achieved by those of ordinary skill in the art. When the combination of the technical solutions is contradictory or cannot be achieved, it should be considered that such a combination of the technical solutions does not exist, and is not within the scope of protection claimed by the present disclosure.

The above descriptions are only preferred embodiments of the present disclosure, and are not intended to limit the patent scope of the present disclosure. Any equivalent structural transformation made by using the content of the specification and the drawings of the present disclosure under the invention idea of the present disclosure, directly or indirectly applied to other related technical fields, shall all be included in the scope of patent protection of the present disclosure.

What is claimed is:

1. A scene simulation device, comprising a housing with a scene space, and flocs, a transport pipeline, and a fan which are arranged in the housing, wherein one end of the transport pipeline is communicated to a bottom of the scene space, and the other end is located at a position, close to a top, of the scene space; the flocs are configured to enter the transport pipeline along the bottom of the scene space, are transported along the transport pipeline when the fan is started, and are sprayed out from a top of the transport pipeline; and a dispersing component configured to disperse the flocs sprayed out of the transport pipeline is arranged in the scene space;

wherein the housing comprises a housing base; the transport pipeline comprises a bottom pipeline communicated to the scene space and a vertical pipeline connected to the bottom pipeline; the bottom pipeline is connected to an air outlet of the fan;

the housing base comprises a surface housing and a bottom plate connected to the surface housing to form a mounting cavity; the fan and the bottom pipeline are both located in the mounting cavity;

the surface housing is provided with a first through hole communicated with the bottom pipeline and a second through hole communicated with the bottom pipeline and the vertical pipeline respectively; and the fan is located on one side, far from the vertical pipeline, of the first through hole.

2. The scene simulation device according to claim 1, wherein the dispersing component and the housing are integrally formed.

3. The scene simulation device according to claim 1, wherein the dispersing component is arranged towards the top of the transport pipeline, and at least part of an outer surface of the dispersing component is one of a spherical surface, a class spherical surface, cambered surface, a class cambered surface, and a slope; and each of the class spherical surface and the class cambered surface is composed of at least one cambered surface and/or at least one plane.

4. The scene simulation device according to claim 3, wherein an atmosphere lamp is arranged at the top of the scene space.

5. The scene simulation device according to claim 4, wherein a scene base and a scene decoration arranged on the scene base are arranged in the scene space, and a bottom surface of the scene base is spaced apart from a bottom surface of the scene space.

6. The scene simulation device according to claim 5, wherein a width of a cross section of the scene base gradually decreases from bottom to top, and a circumferential side of the scene base is spaced part from a side wall of the scene space; and a width of a cross section of the bottom surface of the scene space gradually decreases from top to bottom.

7. The scene simulation device according to claim 6, wherein the housing further comprises a middle frame connected to the housing base, and a top housing connected to the middle frame; the scene space is composed of the housing base, the middle frame, and the top housing;

the plurality of display windows are located on a side wall of the middle frame; the dispersing component is located on the top housing; the fan and the bottom pipeline are both located in the housing base; and the vertical pipeline is located on an inner side of the middle frame.

8. The scene simulation device according to claim 7, wherein the bottom pipeline comprises: two pipeline side walls integrally injection-molded with the surface housing and a panel connected to the pipeline side walls; the surface housing protrudes upwards along a circumferential side of the second through hole to form a plugging enclosure wall; and a bottom of the vertical pipeline is arranged in the plugging enclosure wall.

9. The scene simulation device according to claim 8, wherein the surface housing comprises a boss, a first step connected to a bottom of the boss, and a second step connected to a bottom of the first step; a bottom of the middle frame sleeves an outer side of the first step and is connected to the second step; and the transparent plates are located between an inner side wall of the middle frame and an outer side wall of the boss.

10. The scene simulation device according to claim 9, wherein a handle portion is arranged at a top of the top housing.

11. The scene simulation device according to claim 10, wherein the top housing further comprises a top connecting body; the top connecting body comprises a left housing arranged at a top of the outer cover and a right housing connected to the left housing and forming an accommodating cavity penetrating through the top connecting body; and two ends, close to the accommodating cavity, of the handle portion arranged in the accommodating cavity are raised to form limiting convex blocks.

12. The scene simulation device according to claim 10, wherein the top housing comprises an outer cover and a transparent inner cover arranged on an inner side of the outer cover; a plurality of light decoration holes are formed in both the outer cover and the middle frame; and the dispersing component is integrally formed with the transparent inner cover.

13. The scene simulation device according to claim 5, wherein the bottom surface of the scene space is connected to the scene base through a plurality of support columns spaced apart from each other.

14. The scene simulation device according to claim 13, wherein a plurality of display windows are formed in a side wall of the housing; transparent plates are arranged at the display windows; and the transport pipeline is located between two adjacent display windows.

15. The scene simulation device according to claim 14, wherein the vertical pipeline is parallel to a side wall of the scene space; and the vertical pipeline is located directly below the dispersing component at one end far from the bottom pipeline.

16. A scene simulation device, comprising a housing with a scene space, and flocs, a transport pipeline, and a fan which are arranged in the housing, wherein one end of the transport pipeline is communicated to a bottom of the scene space, and the other end is located at a position, close to a top, of the scene space; the flocs are configured to enter the transport pipeline along the bottom of the scene space, are transported along the transport pipeline when the fan is started, and are sprayed out from a top of the transport pipeline; and a dispersing component configured to disperse the flocs sprayed out of the transport pipeline is arranged in the scene space;

wherein the housing further comprises a housing base, a middle frame connected to the housing base, and a top housing connected to the middle frame; the scene space is composed of the housing base, the middle frame, and the top housing;

wherein the top housing comprises an outer cover and a transparent inner cover arranged on an inner side wall of the outer cover; a plurality of light decoration holes are formed in both the outer cover and the middle frame; and the dispersing component is integrally formed with the transparent inner cover.

17. The scene simulation device according to claim 16, wherein a first plugging slot for plugging the middle frame is formed in a bottom surface of the outer cover; the outer cover forms a plurality of limiting plates on an inner side of the first plugging slot; the limiting plates are located on an inner side wall of the middle frame and are spaced apart from the inner side wall of the middle frame to form a second plugging slot; and the transparent plates are located in the second plugging slot.

18. The scene simulation device according to claim 17, wherein an atmosphere lamp is arranged at the top of the scene space, a circuit board electrically connected to the fan and the atmosphere lamp is arranged in the housing base, and a USB interface electrically connected to the circuit board and used for data transmission is arranged on the housing base.

19. The scene simulation device according to claim 18, wherein a speaker electrically connected to the circuit board is also arranged in the housing base, and a sound outlet is formed in a position, corresponding to the speaker, on a bottom of the housing base.

20. The scene simulation device according to claim 19, wherein the circuit board is provided with a wireless module configured to be connected to external equipment.

* * * * *